United States Patent [19]

Pernet

[11] Patent Number: 5,673,180
[45] Date of Patent: Sep. 30, 1997

[54] CASE FOR MICROCIRCUIT CARD READER

[75] Inventor: Michel Pernet, Pontarlier, France

[73] Assignee: Framatome Connectors International, Courbevoie, France

[21] Appl. No.: 405,870

[22] Filed: Mar. 17, 1995

[30] Foreign Application Priority Data

Mar. 21, 1994 [FR] France .................. 94 03266

[51] Int. Cl.$^6$ ...................... H05K 5/00
[52] U.S. Cl. .................. 361/756; 361/737; 361/684; 361/686; 361/747; 361/787; 361/740; 361/741; 361/727; 429/99; 429/100
[58] Field of Search ............ 361/684, 686, 361/740, 741, 756, 727, 759, 787, 803, 733, 752, 802, 728, 737, 747; 235/492, 495, 380, 486, 441; 429/99, 100; 439/630, 331, 500

[56] References Cited

U.S. PATENT DOCUMENTS

| 4,743,746 | 5/1988 | Murshall et al. ............ 235/486 |
| 5,039,580 | 8/1991 | Mori et al. ............ 429/97 |
| 5,231,274 | 7/1993 | Reynier et al. ............ 235/441 |
| 5,296,692 | 3/1994 | Shino ............ 235/486 |
| 5,402,095 | 3/1995 | Janniere ............ 235/441 |

FOREIGN PATENT DOCUMENTS

| 274 302 | 7/1988 | European Pat. Off. . |
| 480 334 | 4/1992 | European Pat. Off. . |
| 2 687 238 | 8/1993 | France . |
| 36 42 424 | 6/1987 | Germany . |

*Primary Examiner*—Leo P. Picard
*Assistant Examiner*—Phuong T. Vu
*Attorney, Agent, or Firm*—Pollock, Vande Sande & Priddy

[57] ABSTRACT

A case for microcircuit card reader, including a case body (1), an electronic circuit incorporated into the case body, a device for guiding the card and holding it in place, and a connector provided with elastic contact segments ensuring an electrical connection between the conductor elements of the card and the electronic circuit. It includes at least one elastic element (13, 55) for supporting the card by means of an elastic force.

7 Claims, 3 Drawing Sheets

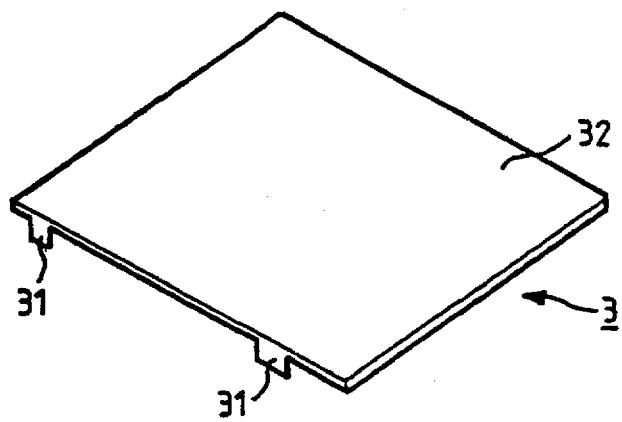
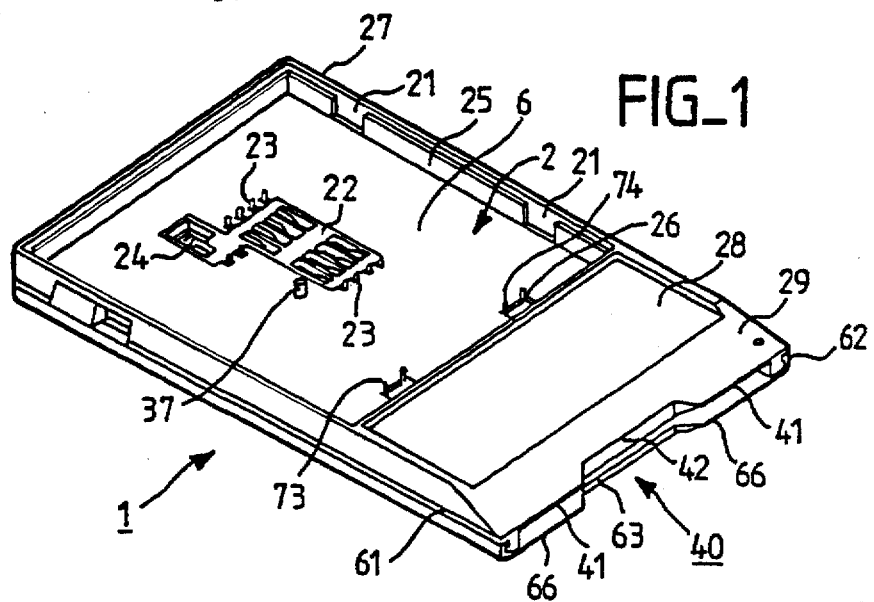
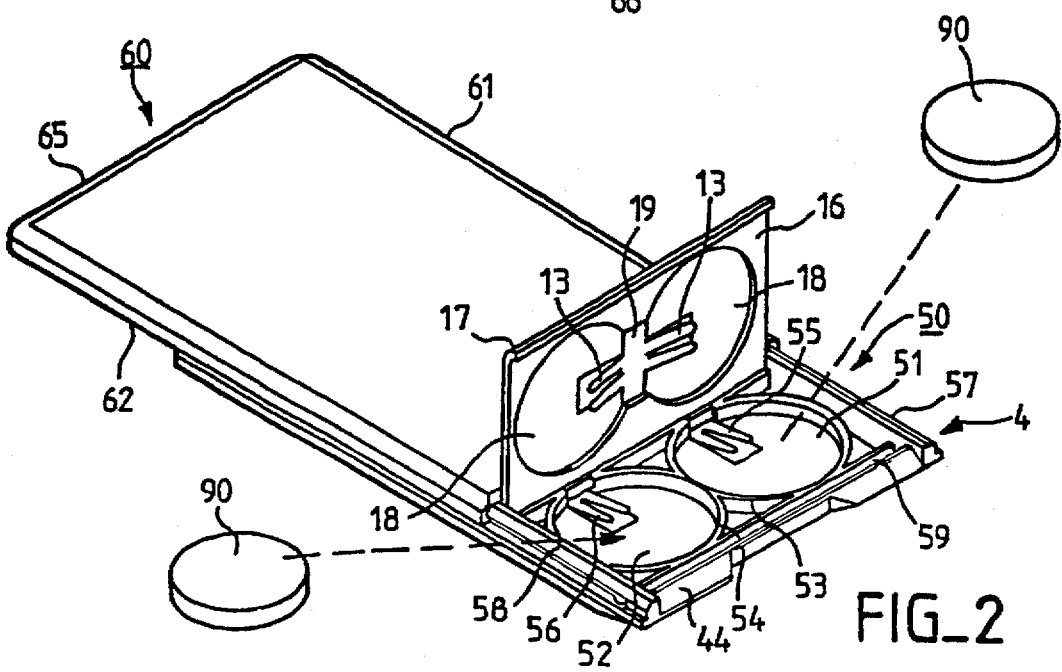

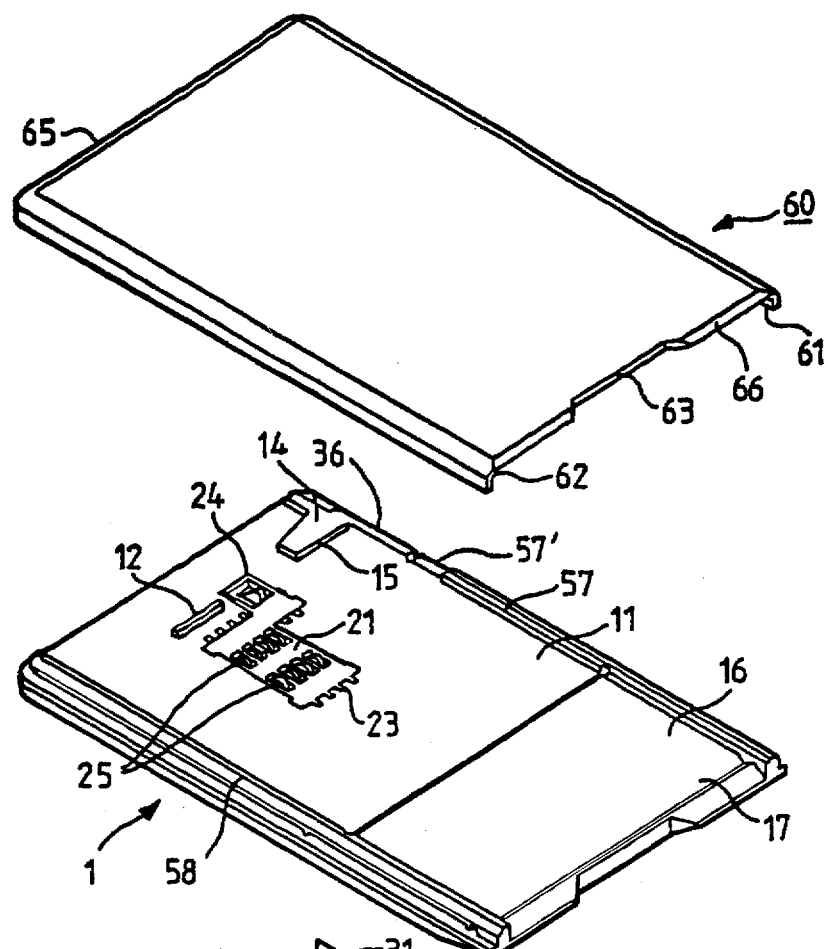
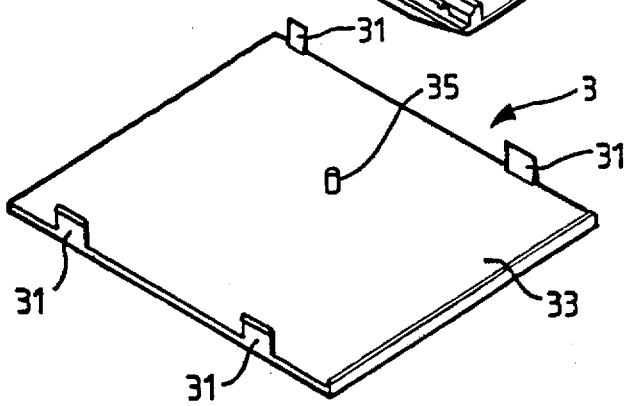
FIG_3
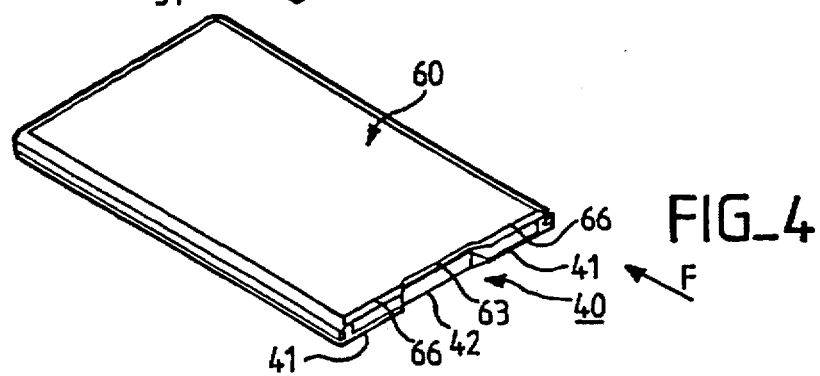
FIG_4

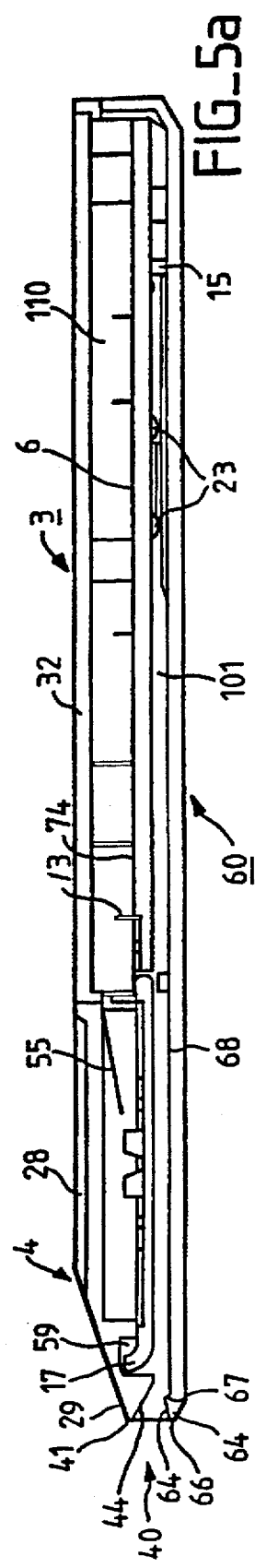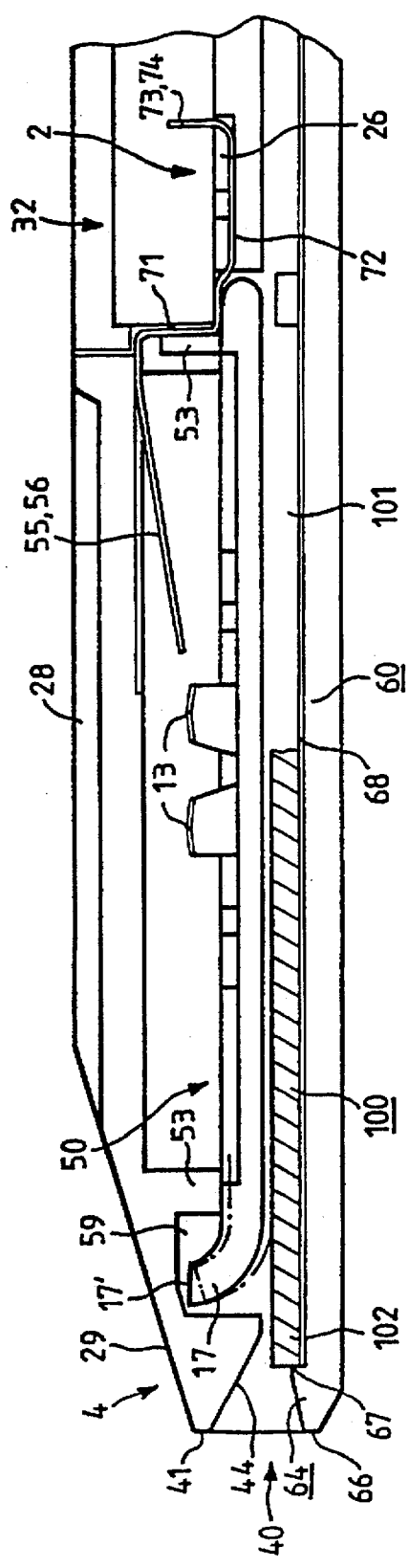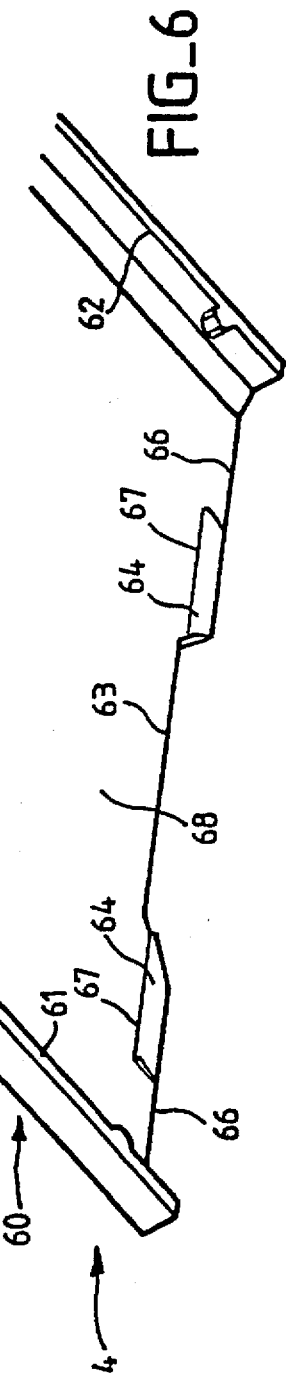

5,673,180

CASE FOR MICROCIRCUIT CARD READER

FIELD OF THE INVENTION

The present invention concerns a case for a microcircuit card reader, comprising a case body, an electronic circuit incorporated into the case body, a device for guiding and holding the card in place, and a connector incorporating elastic contact segments providing an electrical connection between the conductor elements belonging to the card and the aforementioned electronic circuit.

These card reader cases can be used, in particular, as devices called "free hand payments collectors." Such products incorporate an electronic infrared or HF remote data-interchange device and an interchangeable microcircuit card allowing identification of the bearer or used for prepayment, this unit fitting within a format a little larger than that of the card, most notably a PCM CIA format.

In this kind of case, the card must be held in a position which, in relation to the contacts in the connector, must be fairly precisely specified. Moreover, there must be no risk that it will slide out of the case. This kind of case normally holds batteries which supply power to the electronic circuit and which must, therefore, be easily replaceable, while being held in place and protected in their housing.

This case must, first, provide an electrical link between the microcircuit card connector and the electronic circuit, as well as correct positioning of the connector contacts on the contact areas of the card, these connectors lying within the plane of the card.

Moreover, the contact pressure between the contact segments and the card must fall within the mandatory limits. In fact, should this pressure be too low, contact resistance is too high; if, on the other hand, the pressure is too high, the contacts will be exposed to wear and an excessively-high card-insertion force will be generated. From this perspective, it thus becomes necessary also to ensure good relative vertical positioning of the card in relation to the contact segments of the connector; that is, in the direction perpendicular to the plane of the card.

BACKGROUND OF THE INVENTION

In conventional cases, the microcircuit card connector is positioned and soldered on the electronic circuit, position being ensured by the extension lugs of the contacts, which are soldered flat on the lower surface of the circuit. The electronic circuit is mounted on the case body, and the card-guide cover is, in turn, mounted on the case. In this configuration, the horizontal and vertical positions of the card are determined by the cover.

The precision of the vertical positioning is thus made dependent on the sum of the distance from the contact segments of the connector to the surface supporting the connector on the circuit, of the circuit-seating gap, of the distance between the circuit and cover supports, and, finally, of the precision of the cover (distance between the support surfaces on the case body and on the card). This stacking of dimensions tends to cause significant mechanical variation from one case to another, thereby damaging reliability.

SUMMARY OF THE INVENTION

The present invention relates to a case for microcircuit card readers which does not exhibit the aforementioned disadvantage.

Accordingly, the invention concerns a case for microcircuit card readers, comprising a case body, an electronic circuit incorporated into the case body, a device for guiding the card and holding it in place, and a connector incorporating elastic contact segments providing for electrical connection between conductor elements belonging to the card and the aforementioned electronic circuit, and wherein the connector is fastened directly to the body of the case.

In this way, the cumulation of dimensions is avoided and good reliability of the case is ensured.

The connector is advantageously integrated into the body of the case, this attachment being effected by duplicate molding of the elastic contact segments in the case body.

According to a second feature, the invention relates to a case for microcircuit card readers comprising a case body, an electronic circuit incorporated into the body of the case, a device for guiding the card and holding it in position, and a connector incorporating elastic contacts segments, which provide an electrical connection between conductors in the card and the aforementioned electronic circuit, wherein the case comprises a card-support element operating by elastic force.

According to one advantageous variant, the case according to the invention comprises a case cover mounted on the case body, which delimits a space for insertion of the card and, in the card-insertion area, the case body incorporates a housing for an electric power-supply device, this housing comprising a battery housing cover which is held elastically in place by elastic means, in an open position in the absence of a card, and in a closed position when the card is inserted, by generating on the card an elastic force which presses a rear area of the card down on an inner surface of the case cover.

This arrangement makes it possible to support the card against the opposite side of the slot, without generating excessive resistance opposing insertion.

According to this variant of the invention, the battery housing is located in the area of the insertion slot, and the battery housing cover forms one of the sides of the insertion slot, performing the function of the elastic roller of the prior art. In other words, according to the invention, the same elastic element is used to open the battery housing when the batteries are replaced and to perform the aforementioned function, i.e., to support the card.

The inner surface of the battery housing cover advantageously has an insertion edge fitted with a tab for holding the card in place. The case advantageously comprises at least one battery placed in the housing.

The aforementioned elastic means may be leaf springs arranged in the battery housing cover, which may form an electrical battery connection in series.

In a preferred embodiment, the battery housing cover, when in open position, comes to be stopped against the aforementioned inner surface of the case cover. The cover may then have a downward-curved insertion edge, and, in the open position, this curved edge has an end which remains positioned in a housing in the case body.

BRIEF DESCRIPTION OF THE DRAWINGS

Other features and advantages of the invention will become more apparent from a reading of the description below, which is provided by way of example in conjunction with the drawings, in which:

FIG. 1 is a bottom view in perspective of a case according to a preferred embodiment of the invention;

FIG. 2 is a top view in perspective of a device according to the invention, shown in the battery-replacement position;

FIG. 3 is an exploded top view of a case according to one preferred embodiment of the invention;

FIG. 4 is a perspective view of a case according to the invention;

FIG. 5a is a longitudinal cross-section of a case according to the invention, and FIG. 5b is an enlargement of the card-insertion end thereof; and FIG. 6 is a bottom view of detail of the cover of a case according to the invention.

DETAILED DESCRIPTION

In the drawings, a card reader case has a case body 1, which comprises on its lower surface a housing 2 incorporating a bottom 6 in which is housed a connector 22 incorporating contact segments 23 in electrical contact with the metallizations of an electronic circuit 11a positioned in the housing 2 (see FIG. 5a), and leaf springs 25 designed to come into mechanical and electrical contact with contact areas on the card. The connector 22 may also incorporate an end-of-travel contact 24 with the card 100.

According to the invention, the connector 22 is either mounted in the case body 2, or duplicate-molded during manufacture of the case.

In top view (see FIG. 3), the connector 22 is provided with leaf springs 25 designed to come into electrical contact with the metallizations on a microcircuit card 100 inserted in a card housing 101. The lower part of this card housing 101 is delimited by the upper plane 11 of the case body delimited on each side by the slide-rails 57 and 58, and by a hinged battery housing cover 16 for a housing 50 designed to hold batteries 90 arranged in circular recesses 51 and 52 delimited by peripheral areas 53 and 53. It will be noted that the slide-rails 57 and 58 extend along both the battery housing cover 16 and the housing 50. The upper part of the card housing 101 is delimited by the lower surface 68 of a case cover 60 provided on each side with slide-rails 61 and 62 matching the slide-rails 57 and 58 of the body of the case 1.

The housing 101 incorporates an insertion slot 40.

FIG. 4 illustrates the case in the assembled position, in which the case cover 60 has been pushed down, so as to conceal and cover the battery housing 50, while, in FIG. 2, the case cover 60, once it has been pushed back along the slide-rails 57, 58, releases the battery housing cover 16, which can thus be opened, thereby making it possible to change the batteries 90.

In addition, FIG. 3 shows an end-of-travel card stop 12 and a sliding element 14 which comes to be positioned in a cut-out area 57' in the slide-rail 57, so as to form a lateral stop for the card. The sliding element 14 has a stop-motion area 15 and slides in the cut-out area 57' in which the slide-rail 57 is made discontinuous. This sliding motion is generated by the action of the user's finger on the edge 36 of the element 14, which is accessible from the outside, and it allows the card 100 to be released from the housing 10'.

A housing 2 in which the circuit 110 was positioned is reclosed by a removable cover 3 having lateral tabs 31, four in the case shown, which are inserted in four corresponding recesses 21 in an edge 25 enclosing an edge 25 arranged inside an outer contour 27 of the housing 2. The removable cover 3 also has, on its lower surface 33, a pin 35, which comes to rest on a matching pin 37 positioned in the central part of the bottom 6.

The battery housing cover 16 is provided, on its lower surface 18, with a conductor having a central tab 19 and, on each side, two leaf springs 13, each of which comes to rest on an electrode belonging to the batteries 90, thereby forming a series connection between these batteries. The battery recesses 51 and 52 are provided, on their inner surface, with an elastic element incorporating two leaf springs, 55 and 46 respectively, which are in electrical contact with the other electrode belonging to the batteries 90.

As shown in FIG. 5b, these pairs of leaf springs 55, 56 are in electrical contact with power-feed tabs 73 and 74 belonging to the electronic circuit 110.

When standard batteries are placed in the housings 51 and 52, the hinged battery housing cover 16 does not reclose completely, and there remains an elastic force which pushes the cover 16 back against the lower surface 68 of the case cover 60. The battery housing cover 16 has, in the area 4 in which the card 100 is inserted, a downward-curved area 17, which serves as an insertion profile for the card 100, thereby ensuring that, when the card 100 is inserted, the battery housing cover 16 will be pushed downward by the card and close the housing 50. When the card is inserted completely so that its advancing end is stopped against the stop 12, 14, the rear edge 102 of the card engages in the vertical edge 67 of the tabs 64 provided on the lower edge of the case cover 60, in the area 4 in which the card 100 is inserted (see FIG. 6). It will be noted, moreover, that the proximate edge 66 of the cover 60 has, in a central area, a notch 63 substantially perpendicular to the direction F in which the card 100 is inserted, and which extends beyond the vertical edges 67 of the tabs 64 positioned on either side of the notch 63.

Furthermore, a notch 42 is located opposite the notch 63 in the central part of the proximate edge 41 of the case body 2. Accordingly, the user of a card 100 may, by pressing down on this card, release it from the case in order to remove it, possibly in cooperation with the sliding element 14.

The curved area 17 is housed in a recess 59 in the case body located beyond the bevelled insertion area 44.

When the card 100 is removed from the case, the combined effect of the elastic leaf springs 13, 55, and 56 causes the battery housing cover 16 to be pushed toward the top of the case, in such a way that it comes into contact with the lower surface 68 of the case cover 60. The curvature of the front edge 17 of the battery housing cover 16 is preferably sufficient to protect the batteries when this front edge is stopped against the cover of the case, when no card is inserted. To this end, it suffices that the length of the curved portion 17 be sufficient so that, in this case, the end 17' thereof remains in the recess 59. In this way, a certain degree of impermeability is obtained in the area of the card-insertion slot 40, in particular impermeability to dust.

With reference to FIGS. 1 and 3 more especially, it will be noted that the connector 22 is positioned and fastened to the body of the case 1, for example by ultrasound soldering or by direct duplicate molding. The electronic circuit 110 (see. FIG. 5a) is attached to the case body and accepts insertion of the tabs 23 belonging to the contact segments of the connector 22. These tabs are either soldered on the surface in the electronic circuit 110, or are inserted into holes in this circuit to allow soldering or force-fitting. The horizontal positioning of the circuit on the case body must be precise enough to allow these tabs to be put in place easily.

The card is positioned vertically by means of the case cover 60, and is positioned horizontally by means of the body of the case 1.

The precision of the vertical positioning is thus given by the total of:

a) the distance from the contact segments to the surface supporting the connector on the case body;

b) on the case body, the distance between the connector and cover supports;

c) the precision of the case cover (distance between the support surfaces on the case body and on the card).

In comparison with the prior art solution, one part (electronic circuit 110) has been subtracted from the series of dimensions relating to the vertical positioning of the contact segments 25 in relation to the card 100.

Thus, the proper operation of the card/connector unit no longer depends on the mechanical precision of a circuit/connector assembly, thereby facilitating the manufacture of the electronic circuit and of the mechanical component.

I claim:

1. Case for microcircuit card reader, comprising a case body, an electronic circuit incorporated into said case body, a device for guiding a card (100) and holding it in position, a connector provided with elastic contact segments, ensuring electrical contact between conductor elements belonging to said card (100) and said electronic circuit, at least one elastic element (13, 55) supporting said card (100) by elastic force and a case cover (60) mounted on said case body and delimiting a space (101) for insertion on said card (100), wherein, in one area (4) designed for insertion of said card (100), said case body (2) incorporates a housing (50) for an electric power-feed device, said housing (50) having a housing cover (16) which is held elastically in place by at least one of said elastic elements, both in open position in the absence of said card (100), and in closed position when the card (100) is inserted, by exerting on said card (100) an elastic force which presses a rear area (102) of said card down on an inner surface (68) of said case cover (60).

2. Case according to claim 1, wherein said inner surface (68) of said case cover (60) has an insertion edge (66) provided with a tab (64) for holding said card (100) in position.

3. Case according to claim 1 comprising at least one battery (90) arranged in said housing (50).

4. Case according to claim 3, wherein said elastic elements (13) are leaf springs arranged in said housing cover (16).

5. Case according to claim 4, wherein said leaf springs (13) are arranged so as to constitute an electrical connection used for operation of batteries (90).

6. Case according to claim 1 wherein, in open position, said housing cover (16) is stopped against said inner surface (68) of said case cover (60).

7. Case according to claim 6, wherein said housing cover (16) provided with a curved entry edge (17), and, in said open position, one end (17') of said curved edge (17) remains positioned in a recess (59) in said case body (2).

* * * * *